United States Patent
Ekin et al.

(10) Patent No.: US 10,731,051 B2
(45) Date of Patent: Aug. 4, 2020

(54) BASECOAT ACID NEUTRALIZATION THROUGH INORGANIC SALTS

(71) Applicant: Covestro LLC, Pittsburgh, PA (US)

(72) Inventors: Alan Ekin, Coraopolis, PA (US); Alan D. Bushmire, Canonsburg, PA (US)

(73) Assignee: Covestro LLC, Pittsburgh, PA (US)

( * ) Notice: Subject to any disclaimer, the term of this patent is extended or adjusted under 35 U.S.C. 154(b) by 116 days.

(21) Appl. No.: 15/933,570

(22) Filed: Mar. 23, 2018

(65) Prior Publication Data
US 2019/0292401 A1    Sep. 26, 2019

(51) Int. Cl.
| | | |
|---|---|---|
| C09D 175/02 | (2006.01) | |
| C09J 175/02 | (2006.01) | |
| C08K 5/29 | (2006.01) | |
| C08G 18/02 | (2006.01) | |
| C09D 5/02 | (2006.01) | |
| C09D 5/03 | (2006.01) | |
| C08L 75/02 | (2006.01) | |
| C08G 18/42 | (2006.01) | |
| C08G 18/20 | (2006.01) | |
| C08G 18/62 | (2006.01) | |
| C08G 18/18 | (2006.01) | |
| C08G 18/78 | (2006.01) | |
| C08G 18/48 | (2006.01) | |
| C08G 18/79 | (2006.01) | |
| C09J 175/04 | (2006.01) | |
| C09D 175/04 | (2006.01) | |
| C08G 18/44 | (2006.01) | |
| C09D 7/63 | (2018.01) | |

(52) U.S. Cl.
CPC .......... *C09D 175/02* (2013.01); *C08G 18/027* (2013.01); *C08G 18/1858* (2013.01); *C08G 18/2027* (2013.01); *C08G 18/2036* (2013.01); *C08G 18/2063* (2013.01); *C08G 18/2072* (2013.01); *C08G 18/42* (2013.01); *C08G 18/4277* (2013.01); *C08G 18/44* (2013.01); *C08G 18/48* (2013.01); *C08G 18/6229* (2013.01); *C08G 18/7837* (2013.01); *C08G 18/797* (2013.01); *C08G 18/798* (2013.01); *C08K 5/29* (2013.01); *C08L 75/02* (2013.01); *C09D 5/028* (2013.01); *C09D 5/035* (2013.01); *C09D 175/04* (2013.01); *C09J 175/02* (2013.01); *C09J 175/04* (2013.01); *C08G 2190/00* (2013.01); *C08K 2201/012* (2013.01); *C09D 7/63* (2018.01)

(58) Field of Classification Search
CPC ...... C09D 175/02; C09D 5/035; C09D 5/028; C09D 7/63; C09D 175/04; C08L 75/02; C08G 18/027; C08G 18/7837; C08G 18/797; C08G 18/798; C08G 18/2036; C08G 18/2063; C08G 18/2072; C08G 18/1858; C08G 18/42; C08G 18/4277; C08G 18/44; C08G 18/48; C08G 18/6229; C08G 18/2027; C08G 2190/00; C08K 5/29; C08K 2201/012; C09J 175/02; C09J 175/04
See application file for complete search history.

(56) References Cited

U.S. PATENT DOCUMENTS

| | | |
|---|---|---|
| 3,169,949 A | 2/1965 | Boning |
| 5,814,689 A | 9/1998 | Goldstein et al. |
| 5,861,193 A | 1/1999 | Goldstein et al. |
| 5,916,629 A | 6/1999 | Wenning et al. |
| 8,791,223 B2 | 7/2014 | Zalich et al. |
| 9,080,074 B2 | 7/2015 | Shaffer et al. |
| 9,102,785 B2 | 8/2015 | Martz et al. |
| 2006/0052527 A1 | 3/2006 | Weikard et al. |
| 2006/0247341 A1 | 11/2006 | Hsieh et al. |
| 2008/0194787 A1* | 8/2008 | Weiss ............... C08G 18/0895 528/67 |
| 2009/0264587 A1 | 10/2009 | Blum et al. |
| 2012/0225982 A1* | 9/2012 | Ravichandran ...... C08K 5/0091 524/196 |

(Continued)

FOREIGN PATENT DOCUMENTS

| | | |
|---|---|---|
| DE | 102008040967 A1 | 2/2010 |
| DE | 102012218081 A1 | 4/2014 |

OTHER PUBLICATIONS https://pubchem.ncbi.nlm.nih.gov/compound/1H-1 2 4-Triazole -sodium-salt (Year: 2019).*

(Continued)

*Primary Examiner* — Rabon A Sergent
(74) *Attorney, Agent, or Firm* — Richard P. Bender; John E. Mrozinski, Jr.

(57) ABSTRACT

The present invention provides a system comprising an allophanate composition comprising a neutralized polyol, a polyuretdione resin, a tertiary amine catalyst, an additive package, and a reducer; and a neutralized basecoat comprising an inorganic salt and a pigment. The present invention further provides a method of making an allophanate system comprising combining a neutralized polyol with a polyuretdione resin in the presence of a tertiary amine catalyst, an additive package, and a reducer to produce an allophanate composition, and contacting the allophanate composition with a neutralized basecoat comprising an inorganic salt and a pigment. The system may be used to make coatings, adhesives, castings, composites, and sealants in which clearcoating on neutralized pigmented basecoats is much improved in comparison to coating on non-neutralized basecoats.

34 Claims, No Drawings

(56) References Cited

U.S. PATENT DOCUMENTS

2014/0275345 A1* 9/2014 Williams ............. C08F 124/00
523/445
2016/0017179 A1 1/2016 Spyrou et al.

OTHER PUBLICATIONS

International Search Report, PCT/US2019/023334, dated Jun. 28, 2019, authorized offer: Christine Voigt.

* cited by examiner

BASECOAT ACID NEUTRALIZATION THROUGH INORGANIC SALTS

FIELD OF THE INVENTION

The present invention relates, in general to polymers, and more specifically, to polymers made with neutralized polyols, uretdiones and tertiary amine catalysts that cure over neutralized basecoats. The resulting allophanate polymers may be used to make coatings, adhesives, castings, composites, and sealants.

BACKGROUND OF THE INVENTION

Polyurethane-forming compositions are widely used in a variety of commercial, industrial and household applications, such as in automotive clear-coat and seat cushion applications. Polyurethane systems that employ isocyanates which are pre-reacted with monofunctional reagents to form relatively thermally labile compounds are called blocked isocyanates. Uretdiones are a type of blocked isocyanate. Uretdiones are typically prepared by dimerizing an isocyanate to form uretdione(s) with unreacted isocyanate end-groups which can then be extended with a polyol to form a polymeric material containing two or more uretdione groups in the polymer chain. In some literature, uretdiones are referred to as "1,3-diaza-2,4-cyclobutanones", "1,3-diazatidin-2,4-diones", "2,4-dioxo-1,3-diazetidines", "urethdiones" or "uretidiones". Typically, the polymer has few, if any, free isocyanate groups, which is achieved by controlling the stoichiometry of the polyisocyanate, of the polyol, and by the use of a blocking agent.

The reaction of uretdiones with polyols to form polyurethane coatings is well known in the art, especially in polyurethane powder coatings. However, the creation of allophanates from uretdiones and polyols at ambient or low temperatures in the presence of a tertiary amine catalyst has not been well-studied in the literature. To the best of the present inventors' knowledge, no one has developed a cross-linking approach using neutralized polyols to promote successful conversion of uretdione to allophanate at ambient or low temperatures in the presence of tertiary amine catalysts over neutralized basecoats.

SUMMARY OF THE INVENTION

Uretdione-based clear coats face some challenges when applied over pigmented basecoats due to the acidic nature of the basecoats. When basecoats are neutralized with an inorganic salt, uretdione-based clear-coating is much improved in comparison to non-neutralized basecoats.

Accordingly, the present invention attempts to alleviate problems inherent in the art by providing such an alternative cross-linking approach to obtain compositions having physical properties similar to those of polyurethane compositions. To increase the conversion rate of uretdione and polyol to form allophanate groups at ambient or low temperatures in the presence of a tertiary amine catalyst over a neutralized basecoat, the acidity of the polyol, and basecoat, and more generally, the acidity of the system is minimized or eliminated. Thus, various embodiments of the inventive approach involve crosslinking polyuretdione resins with neutralized polyols in the presence of a tertiary amine catalyst over a neutralized basecoat. The polyol may be neutralized by reaction with an epoxy or cabodiimide at a temperature ranging from room temperature (21° C.-24° C.) to 1200. The resulting allophanate polymer may be used to make coatings, adhesives, castings, composites, and sealants. The basecoat may be neutralized by complex formation with an inorganic salt. The uretdione-based clear-coating of the invention may be applied over neutralized basecoats.

It is understood that the invention disclosed and described in this specification is not limited to the embodiments summarized in this Summary.

DETAILED DESCRIPTION OF THE INVENTION

The present invention will now be described for purposes of illustration and not limitation. Except in the operating examples, or where otherwise indicated, all numbers expressing quantities, percentages, and so forth in the specification are to be understood as being modified in all instances by the term "about."

Any numerical range recited in this specification is intended to include all sub-ranges of the same numerical precision subsumed within the recited range. For example, a range of "1.0 to 10.0" is intended to include all sub-ranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited in this specification is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such sub-ranges would comply with the requirements of 35 U.S.C. § 112(a), and 35 U.S.C. § 132(a).

Any patent, publication, or other disclosure material identified herein is incorporated by reference into this specification in its entirety unless otherwise indicated, but only to the extent that the incorporated material does not conflict with existing definitions, statements, or other disclosure material expressly set forth in this specification. As such, and to the extent necessary, the express disclosure as set forth in this specification supersedes any conflicting material incorporated by reference herein. Any material, or portion thereof, that is said to be incorporated by reference into this specification, but which conflicts with existing definitions, statements, or other disclosure material set forth herein, is only incorporated to the extent that no conflict arises between that incorporated material and the existing disclosure material. Applicant reserves the right to amend this specification to expressly recite any subject matter, or portion thereof, incorporated by reference herein.

Reference throughout this specification to "various non-limiting embodiments," "certain embodiments," or the like, means that a particular feature or characteristic may be included in an embodiment. Thus, use of the phrase "in various non-limiting embodiments," "in certain embodiments," or the like, in this specification does not necessarily refer to a common embodiment, and may refer to different embodiments. Further, the particular features or characteristics may be combined in any suitable manner in one or more embodiments. Thus, the particular features or characteristics illustrated or described in connection with various or certain embodiments may be combined, in whole or in part, with the features or characteristics of one or more other embodiments without limitation. Such modifications and variations are intended to be included within the scope of the present specification.

The grammatical articles "a", "an", and "the", as used herein, are intended to include "at least one" or "one or more", unless otherwise indicated, even if "at least one" or "one or more" is expressly used in certain instances. Thus, these articles are used in this specification to refer to one or more than one (i.e., to "at least one") of the grammatical objects of the article. By way of example, and without limitation, "a component" means one or more components, and thus, possibly, more than one component is contemplated and may be employed or used in an implementation of the described embodiments. Further, the use of a singular noun includes the plural, and the use of a plural noun includes the singular, unless the context of the usage requires otherwise.

In various embodiments, the present invention provides a system comprising an allophanate composition comprising a neutralized polyol, a polyuretdione resin, a tertiary amine catalyst, an additive package, and a reducer; and a neutralized basecoat comprising an inorganic salt and a pigment. In certain embodiments, the present invention further provides a method of making an allophanate system comprising combining a neutralized polyol with a polyuretdione resin in the presence of a tertiary amine catalyst, an additive package, and a reducer to produce an allophanate composition, and contacting the allophanate composition with a neutralized basecoat comprising an inorganic salt and a pigment. The polyol may be neutralized with a carbodiimide or an epoxy acid scavenger at a temperature ranging from room temperature (21° C.-24° C.) to 120° C. The basecoat may be neutralized with an inorganic salt through complex formation with acidic groups within the basecoat. Thus, the present invention provides a method for producing an allophanate polymer over neutralized basecoats by the following route:

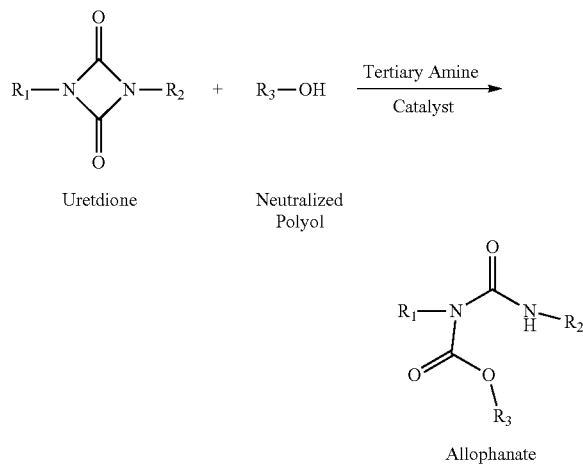

The inventive allophanate polymer system is particularly applicable in producing coatings, adhesives, castings, composites, and sealants.

As used herein, the term "polymer" encompasses prepolymers, oligomers and both homopolymers and copolymers; the prefix "poly" in this context referring to two or more. As used herein, the term "molecular weight", when used in reference to a polymer, refers to the number average molecular weight, unless otherwise specified.

As used herein, the term "polyol" refers to compounds comprising at least two free hydroxy groups. Polyols include polymers comprising pendant and terminal hydroxy groups.

As used herein, the term "coating composition" refers to a mixture of chemical components that will cure and form a coating when applied to a substrate.

The terms "adhesive" or "adhesive compound", refer to any substance that can adhere or bond two items together. Implicit in the definition of an "adhesive composition" or "adhesive formulation" is the concept that the composition or formulation is a combination or mixture of more than one species, component or compound, which can include adhesive monomers, oligomers, and polymers along with other materials.

A "sealant composition" refers to a composition which may be applied to one or more surfaces to form a protective barrier, for example, to prevent ingress or egress of solid, liquid or gaseous material or alternatively to allow selective permeability through the barrier to gas and liquid. In particular, it may provide a seal between surfaces.

A "casting composition" refers to a mixture of liquid chemical components which is usually poured into a mold containing a hollow cavity of the desired shape, and then allowed to solidify.

A "composite" refers to a material made from two or more polymers, optionally containing other kinds of materials. A composite has different properties from those of the individual polymers/materials which make it up.

"Cured," "cured composition" or "cured compound" refers to components and mixtures obtained from reactive curable original compound(s) or mixture(s) thereof which have undergone chemical and/or physical changes such that the original compound(s) or mixture(s) is(are) transformed into a solid, substantially non-flowing material. A typical curing process may involve crosslinking.

The term "curable" means that an original compound(s) or composition material(s) can be transformed into a solid, substantially non-flowing material by means of chemical reaction, crosslinking, radiation crosslinking, or the like. Thus, compositions of the invention are curable, but unless otherwise specified, the original compound(s) or composition material(s) is(are) not cured.

The term "basecoat" means the first (undermost) layer applied to the surface of a substrate prior to application of a subsequent or finishing coat. The term encompasses basecoats, undercoats, and tiecoats.

The components useful in the present invention comprise a polyisocyanate. As used herein, the term "polyisocyanate" refers to compounds comprising at least two unreacted isocyanate groups, such as three or more unreacted isocyanate groups. The polyisocyanate may comprise diisocyanates such as linear aliphatic polyisocyanates, aromatic polyisocyanates, cycloaliphatic polyisocyanates and aralkyl polyisocyanates.

Particularly preferred in the present invention are those blocked isocyanates known as uretdiones. The uretdiones useful in the invention may be obtained by catalytic dimerization of polyisocyanates by methods which are known to those skilled in the art. Examples of dimerization catalysts include, but are not limited to, trialkylphosphines, aminophosphines and aminopyradines such as dimethylaminopyridines, and tris(dimethylamino)phosphine, as well as any other dimerization catalyst. The result of the dimerization reaction depends, in a manner known to the skilled person, on the catalyst used, on the process conditions and on the polyisocyanates employed. In particular, it is possible for products to be formed which contain on average more than one uretdione group per molecule, the number of uretdione groups being subject to a distribution. The (poly) uretdiones may optionally contain isocyanurate, biuret, allophanate, and iminooxadiazine dione groups in addition to the uretdione groups.

The uretdiones are NCO-functional compounds and may be subjected to a further reaction, for example, blocking of the free NCO groups or further reaction of NCO groups with NCO-reactive compounds having a functionality of two or more to extend the uretdiones to form polyuretdione prepolymers. This gives compounds containing uretdione groups and of higher molecular weight, which, depending on the chosen proportions, may also contain NCO groups, be free of NCO groups or may contain isocyanate groups that are blocked.

Suitable blocking agents include, but are not limited to, alcohols, lactams, oximes, malonates, alkyl acetoacetates, triazoles, phenols, imidazoles, pyrazoles and amines, such as butanone oxime, diisopropylamine, 1,2,4-triazole, dimethyl-1,2,4-triazole, imidazole, diethyl malonate, ethyl acetoacetate, acetone oxime, 3,5-dimethylpyrazole, caprolactam, N-tert-butylbenzylamine and cyclopentanone including mixtures of these blocking agents.

Examples of NCO-reactive compounds with a functionality of two or more include polyols. In some embodiments, the NCO-reactive compounds are used in amounts sufficient to react with all free NCO groups in the uretdione. By "free NCO groups" it is meant all NCO groups not present as part of the uretdione, isocyanurate, biuret, allophanate and iminooxadiazine dione groups.

The resulting polyuretdione contains at least 2, such as from 2 to 10 uretdione groups. More preferably, the polyuretdione contains from 5% to 45% uretdione, 10% to 55% urethane, and less than 2% isocyanate groups. The percentages are by weight based on total weight of resin containing uretdione, urethane, and isocyanate.

Suitable polyisocyanates for producing the uretdiones useful in embodiments of the invention include, organic diisocyanates represented by the formula

R(NCO)$_2$ wherein R represents an organic group obtained by removing the isocyanate groups from an organic diisocyanate having (cyclo)aliphatically bound isocyanate groups and a molecular weight of 112 to 1000, preferably 140 to 400. Preferred diisocyanates for the invention are those represented by the formula wherein R represents a divalent aliphatic hydrocarbon group having from 4 to 18 carbon atoms, a divalent cycloaliphatic hydrocarbon group having from 5 to 15 carbon atoms, or a divalent araliphatic hydrocarbon group having from 7 to 15 carbon atoms.

Examples of the organic diisocyanates which are particularly suitable for the present invention include 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3- and 1,4-diisocyanate, 1-isocyanato-2-isocyanato-methyl cyclopentane, 1-isocyanato-3-isocyanatomethyl-3,5,5-trimethyl cyclohexane (isophorone diisocyanate or IPDI), bis-(4-isocyanatocyclohexyl)methane, 1,3- and 1,4-bis(isocyanatomethyl)-cyclohexane, bis-(4-isocyanato-3-methyl-cyclohexyl)-methane, α,α,α',α'-tetramethyl-1,3- and 1,4-xylene diisocyanate, 1-isocyanato-1-methyl-4(3)-isocyanato-methyl cyclohexane, and 2,4- and 2,6-hexahydrotoluene diisocyanate, toluene diisocyanate (TDI), diphenylmethane diisocyanate (MDI), pentane diisocyanate (PDI)—bio-based), and, isomers of any of these; or combinations of any of these. Mixtures of diisocyanates may also be used. Preferred diisocyanates include 1,6-hexamethylene diisocyanate, isophorone diisocyanate, and bis(4-isocyanatocyclohexyl)-methane because they are readily available and yield relatively low viscosity polyuretdione polyurethane oligomers.

In some embodiments, the uretdiones may comprise from 35% to 85% resin solids in the composition of present invention, excluding solvents, additives or pigments (colorants). In other embodiments, from 50% to 85% and in still other embodiments, 60% to 85%. The uretdiones may comprise any resin solids amount ranging between any combinations of these values, inclusive of the recited values.

In various embodiments of the present invention, the reaction mixture containing the polyuretdione and the neutralized polyol in the presence of a tertiary amine catalyst may be heated to a temperature of 140° C., in other embodiments to a temperature of from 20° C. to 140° C.

The polyols useful in the present invention may be either low molecular weight (62-399 Da, as determined by gel permeation chromatography) or high molecular weight (400 to 10,000 Da, as determined by gel permeation chromatography) materials and in various embodiments will have average hydroxyl values as determined by ASTM E222-10, Method B, of between 1000 and 10, and preferably between 500 and 50.

The polyols in the present invention include low molecular weight diols, triols and higher alcohols and polymeric polyols such as polyester polyols, polyether polyols, polycarbonate polyols, polyurethane polyols and hydroxy-containing (meth)acrylic polymers.

The low molecular weight diols, triols and higher alcohols useful in the instant invention are known to those skilled in the art. In many embodiments, they are monomeric and have hydroxy values of 200 and above, usually within the range of 1500 to 200. Such materials include aliphatic polyols, particularly alkylene polyols containing from 2 to 18 carbon atoms. Examples include ethylene glycol, 1,4-butanediol, 1,6-hexanediol; cycloaliphatic polyols such as cyclohexane dimethanol. Examples of triols and higher alcohols include trimethylol propane and pentaerythritol. Also useful are polyols containing ether linkages such as diethylene glycol and triethylene glycol.

In various embodiments, the suitable polyols are polymeric polyols having hydroxyl values less than 200, such as 10 to 180. Examples of polymeric polyols include polyalkylene ether polyols, polyester polyols including hydroxyl-containing polycaprolactones, hydroxy-containing (meth)acrylic polymers, polycarbonate polyols and polyurethane polymers.

Examples of polyether polyols include poly(oxytetramethylene) glycols, poly(oxyethylene) glycols, and the reaction product of ethylene glycol with a mixture of propylene oxide and ethylene oxide.

Also useful are polyether polyols formed from the oxyalkylation of various polyols, for example, glycols such as ethylene glycol, 1,4-butane glycol, 1,6-hexanediol, and the like, or higher polyols, such as trimethylol propane, pentaerythritol and the like. One commonly utilized oxyalkylation method is by reacting a polyol with an alkylene oxide, for example, ethylene oxide in the presence of an acidic or basic catalyst.

Polyester polyols can also be used as a polymeric polyol component in the certain embodiments of the invention. The polyester polyols can be prepared by the polyesterification of organic polycarboxylic acids or anhydrides thereof with organic polyols. Preferably, the polycarboxylic acids and polyols are aliphatic or aromatic dibasic acids and diols.

The diols which may be employed in making the polyester include alkylene glycols, such as ethylene glycol and butylene glycol, neopentyl glycol and other glycols such as cyclohexane dimethanol, caprolactone diol (for example, the reaction product of caprolactone and ethylene glycol), polyether glycols, for example, poly(oxytetramethylene) glycol and the like. However, other diols of various types and, as indicated, polyols of higher functionality may also be utilized in various embodiments of the invention. Such higher polyols can include, for example, trimethylol propane, trimethylol ethane, pentaerythritol, and the like, as well as higher molecular weight polyols such as those produced by oxyalkylating low molecular weight polyols. An example of such high molecular weight polyol is the reaction product of 20 moles of ethylene oxide per mole of trimethylol propane.

The acid component of the polyester consists primarily of monomeric carboxylic acids or anhydrides having 2 to 18 carbon atoms per molecule. Among the acids which are useful are phthalic acid, isophthalic acid, terephthalic acid, tetrahydrophthalic acid, hexahydrophthalic acid, adipic acid, azelaic acid, sebacic acid, maleic acid, glutaric acid, chlorendic acid, tetrachlorophthalic acid and other dicarboxylic acids of varying types. Also, there may be employed higher polycarboxylic acids such as trimellitic acid and tricarballylic acid (where acids are referred to above, it is understood that the anhydrides of those acids which form anhydrides can be used in place of the acid). Also, lower alkyl esters of acids such as dimethyl glutamate can be used.

In addition to polyester polyols formed from polybasic acids and polyols, polycaprolactone-type polyesters can also be employed. These products are formed from the reaction of a cyclic lactone such as ε-caprolactone with a polyol with primary hydroxyls such as those mentioned above. Such products are described in U.S. Pat. No. 3,169,949.

In addition to the polyether and polyester polyols, hydroxy-containing (meth)acrylic polymers or (meth) acrylic polyols can be used as the polyol component.

Among the (meth)acrylic polymers are polymers of 2 to 20 percent by weight primary hydroxy-containing vinyl monomers such as hydroxyalkyl acrylate and methacrylate having 2 to 6 carbon atoms in the alkyl group and 80 to 98 percent by weight of other ethylenically unsaturated copolymerizable materials such as alkyl(meth)acrylates; the percentages by weight being based on the total weight of the monomeric charge.

Examples of suitable hydroxy alkyl(meth)acrylates are hydroxy ethyl and hydroxy butyl(meth)acrylate. Examples of suitable alkyl acrylates and (meth)acrylates are lauryl methacrylate, 2-ethylhexyl methacrylate and n-butyl acrylate (n-BA).

In addition to the acrylates and methacrylates, other copolymerizable monomers which can be copolymerized with the hydroxyalkyl (meth)acrylates include ethylenically unsaturated materials such as monoolefinic and diolefinic hydrocarbons, halogenated monoolefinic and diolefinic hydrocarbons, unsaturated esters of organic and inorganic acids, amides and esters of unsaturated acids, nitriles and unsaturated acids and the like. Examples of such monomers include styrene, 1,3-butadiene, acrylamide, acrylonitrile, α-methyl styrene, α-methyl chlorostyrene, vinyl butyrate, vinyl acetate, alkyl chloride, divinyl benzene, diallyl itaconate, triallyl cyanurate and mixtures thereof. Preferably, these other ethylenically unsaturated materials are used in admixture with the above-mentioned acrylates and methacrylates.

In certain embodiments of the invention, the polyol may be a polyurethane polyol. These polyols can be prepared by reacting any of the above-mentioned polyols with a minor amount of polyisocyanate (OH/NCO equivalent ratio greater than 1:1) so that free primary hydroxyl groups are present in the product. In addition to the high molecular weight polyols mentioned above, mixtures of both high molecular weight and low molecular weight polyols such as those mentioned above may be used.

Suitable hydroxy-functional polycarbonate polyols may be those prepared by reacting monomeric diols (such as 1,4-butanediol, 1,6-hexanediol, di-, tri- or tetraethylene glycol, di-, tri- or tetrapropylene glycol, 3-methyl-1,5-pentanediol, 4,4'-dimethylolcyclohexane and mixtures thereof) with diaryl carbonates (such as diphenyl carbonate, dialkyl carbonates (such as dimethyl carbonate and diethyl carbonate), alkylene carbonates (such as ethylene carbonate or propylene carbonate), or phosgene. Optionally, a minor amount of higher functional, monomeric polyols, such as trimethylolpropane, glycerol or pentaerythritol, may be used.

In various embodiments of the invention, the polyol is neutralized, for example by the addition of an epoxy or carbodiimide acid scavenger and the basecoat by the addition of an inorganic salt. The present inventors believe, without wishing to be bound to any specific theory, that these acid scavengers covalently bind to carboxylic and acrylic acid groups within the polyols and the basecoat, respectively.

Suitable epoxy or carbodiimide acid scavenging compounds are commercially available from a variety of suppliers such as, for example, the monomeric carbodiimides sold under the STABAXOL trade name from Rhein Chemie, and bis-(2,6-diisopropylphenyl) carbodiimide sold as EUSTAB HS-700 by Eutec Chemical Co., Ltd. Glycidyl ethers, such as 1,4-cyclohexanedimethanol diglycidyl ether, commercially available from Air Products as EPODIL 757 are also suitable in the practice of the present invention.

Inorganic salts should be complexed with the acidic groups within the basecoat. The present inventors believe, without wishing to be bound to any specific theory, that these inorganic salts act as acid scavengers by complexing with the carboxylic and acrylic acid groups within the basecoat. A preferred type of inorganic salt for use in various embodiments of the present invention contains a metal ion. Examples of suitable metal ions for inclusion in the inorganic salts include, but are not limited to, titanium, vanadium, aluminum chromium, manganese, potassium, iron, cobalt, nickel, lithium, copper, zirconium, zinc, and the lanthanides (lanthanum, cerium, praseodymium, neodymium, promethium, samarium, europium, gadolinium, terbium, dysprosium, holmium, erbium, thulium, ytterbium, and lutetium). Suitable inorganic salts for use in the present invention include, but are not limited to, metal acetylacetonates such as zinc(II) acetylacetonate, aluminum acetylacetonate, iron(III) acetylacetonate, lithium acetylacetonate, nickel(II) acetylacetonate, zirconium(IV) acetylacetonate, and potassium acetylacetonate.

In various embodiments, the neutralization of the polyol and of the basecoat is conducted at any temperature ranging from room temperature (21° C.-24° C.) to 120° C., in other embodiments from room temperature (21° C.-24° C.) to 80° C. and in certain embodiments at room temperature (21° C.-24° C.).

Examples of suitable solvents include, but are not limited to aliphatic and aromatic hydrocarbons such as toluene, xylene, isooctane, acetone, butanone, methyl ethyl ketone, methyl amyl ketone, methyl isobutyl ketone, ethyl acetate, butyl acetate, pentyl acetate, tetrahydrofuran, ethyl ethoxypropionate, N-methyl-pyrrolidone, dimethylacetamide and dimethylformamide solvent naphtha, SOLVESSO 100 or HYDROSOL (ARAL), ethers, or mixtures thereof.

Urethane reducers are available in slow, medium and fast formulations, and may improve atomization, flow and leveling, which provide a smooth finish with less "orange peel." Depending on the "speed" of the reducer, it may contain various combinations of compounds including, but not limited to, n-butyl acetate, ethyl acetate, 2-methoxy-1-methylethyl acetate, 1-methoxy-2-propyl acetate, 2-methoxy-1-propyl-acetate, 2-ethoxyethyl acetate, n-heptane, methylcyclohexane, toluene, acetone, Varnish Makers and Painter (VM&P) naphtha, naphtha, light aliphatic solvent naphtha, acetate, isobutyl acetate, mixed xylenes, ethylbenzene, methyl ethyl ketone, dimethyl ketone, methyl n-amyl ketone, methyl isobutyl ketone, 1,2,4-trimethyl benzene, isopropylbenzene, ethyl benzene, 1-chloro-4-(triflouromethyl) benzene, propylene glycol methyl ether, and ethyl-3-ethoxy propionate.

In various embodiments, the basecoats useful in the invention include one or more colorants, such as pigments and dyes. Any suitable pigment can be used in the basecoat of the present invention. Examples of suitable pigments include inorganic white pigments, inorganic chromatic pigments, iron oxide pigments, oxidic mixed-phase pigments, organic pigments, and inorganic black pigments.

As inorganic white pigments, mention should be made in particular of oxides, such as titanium dioxide, zinc oxide (ZnO, zinc white), zirconium oxide, carbonates such as lead white, sulfates, such as lead sulfate, and sulfides such as zinc sulfide, and lithopones; titanium dioxide is particularly preferred.

As inorganic chromatic pigments, mention should be made of those from the group of oxides and hydroxides in the form of their individual inorganic compounds or mixed phases, especially iron oxide pigments, chromium oxide pigments and oxidic mixed-phase pigments with rutile or spinel structure, and also bismuth vanadate, cadmium, cerium sulfide, chromate, ultramarine and iron blue pigments.

Examples of iron oxide pigments are Color Index Pigment Yellow 42, Pigment Red 101, Pigment Blue 11, Pigment Brown 6, and transparent iron oxide pigments. Examples of chromium oxide pigments are Color Index Pigment Green 17 and Pigment Green 18.

Examples of oxidic mixed-phase pigments are nickel titanium yellow and chromium titanium yellow, cobalt green and cobalt blue, zinc iron brown and chromium iron brown, and also iron manganese black and spinel black.

Examples of preferred organic pigments are those of the monoazo, disazo, laked azo, β-naphthol, Naphiol AS, benzimidazolone, disazo condensation, azo metal complex, isoindoline and isoindolinone series, and also polycyclic pigments such as those from the phthalocyanine, quinacridone, perylene, perinone, thioindigo, anthraquinone, dioxazine, quinophthalone and diketopyrrolopyrrole series. Also suitable are laked dyes such as Ca, Mg and Al lakes of dyes containing sulfonic acid or carboxylic acid groups, and also carbon blacks, which for the purposes of this specification are taken to be pigments and of which a large number are known. Mention should be made in particular of acidic to alkaline carbon blacks obtained by the furnace black process, and also chemically surface-modified carbon blacks, examples being sulfo- or carboxyl-containing carbon blacks.

Examples of inorganic black pigments that should be mentioned include those as already described above together with the inorganic chromatic pigments, especially black iron oxide, spinel black, and black oxidic mixed-phase pigments.

The basecoat can contain the pigment at a level of at least 1%, in some cases at least 2%, in other cases at least 5% by weight, in some situations at least 10% and in other situations at least 15% by weight. Also, the basecoat can contain the pigment at a level of up to 60%, in some cases up to 50%, in other cases up to 40%, in some situations up to 35% and in other situations up to 30% by weight, based on the weight of basecoat. The amount of the pigment in the basecoat can be any of the values recited above or can range between any of the values recited above.

The composition of the invention may be contacted with the basecoat by any methods known to those skilled in the art, including but not limited to, spraying, dipping, flow coating, rolling, brushing, pouring, and the like. In certain embodiments, the inventive compositions may be applied in the form of paints or lacquers onto any compatible substrate, such as, for example, metals, plastics, ceramics, glass, and natural materials. In various embodiments, the composition of the invention is applied as a single layer. In other embodiments, the inventive composition may be applied as multiple layers as needed.

The compositions of the present invention (clear-coating, top-coat, and basecoat) may further include any of a variety of additives such as defoamers, devolatilizers, surfactants, thickeners, flow control additives, colorants (including pigments and dyes) or surface additives.

The composition of the invention may be contacted with a substrate by any methods known to those skilled in the art, including but not limited to, spraying, dipping, flow coating, rolling, brushing, pouring, and the like. In some embodiments, the inventive compositions may be applied in the form of paints or lacquers onto any compatible substrate, such as, for example, metals, plastics, ceramics, glass, and natural materials. In certain embodiments, the inventive composition is applied as a single layer. In other embodiments, the composition of the present invention may be applied as multiple layers as needed.

EXAMPLES

The non-limiting and non-exhaustive examples that follow are intended to further describe various non-limiting and non-exhaustive embodiments without restricting the scope of the embodiments described in this specification. All quantities given in "parts" and "percents" are understood to be by weight, unless otherwise indicated. Although the present invention is described in the instant Examples in the context of a coating, those skilled in the art will appreciate it can also be equally applicable to adhesives, castings, composites, and sealants.

The following materials were used in preparing the compositions of the Examples:

BASECOAT A a black polyester refinish basecoat, commercially available from BASF under DIAMONT product line;

REDUCER A a universal medium reducer, commercially available from BASF as RM UR 50, recommended for use in temperatures between approximately 70° F.-85° F. (21.1° C.-29.4° C.);

POLYOL A an aromatic free, branched hydroxyl-bearing polyester polyol, commercially available from Covestro as DESMOPHEN 775 XP;

ADDITIVE A an active anti-hydrolysis agent for polyester polyurethanes, being used as an acid scavenger for acidic groups within the polyols, commercially available from Rhein Chemie as STABAXOL I;

ADDITIVE B a surface additive on polyacrylate-basis for solvent-borne coating systems and printing inks, commercially available from BYK Chemie as BYK 358N;

ADDITIVE C zinc(II) acetylacetonate, an inorganic salt (inorganic scavenger for acidic groups), commercially available from Fisher Scientific;

ADDITIVE D aluminum acetylacetonate, an inorganic salt (inorganic scavenger for acidic groups), commercially available from Fisher Scientific;

ADDITIVE E iron(III) acetylacetonate, an inorganic salt (inorganic scavenger for acidic groups), commercially available from Sigma Aldrich;

ADDITIVE F lithium acetylacetonate, an inorganic salt (inorganic scavenger for acidic groups), commercially available from Fisher Scientific;

ADDITIVE G magnesium acetylacetonate, an inorganic salt (inorganic scavenger for acidic groups), commercially available from Fisher Scientific;

ADDITIVE H nickel(II) acetylacetonate, an inorganic salt (inorganic scavenger for acidic groups), commercially available from Sigma Aldrich;

ADDITIVE I zirconium(IV) acetylacetonate, an inorganic salt (inorganic scavenger for acidic groups), commercially available from Fisher Scientific;

ADDITIVE J potassium acetylacetonate, an inorganic salt (inorganic scavenger for acidic groups), commercially available from Alfa Aesar;

CATALYST A 1,8-diazabicyclo[5.4.0]undec-7-ene (DBU), tertiary amine catalyst, commercially available from Air Products as POLYCAT DBU; and URETDIONE A an IPDI based uretdione prepolymer, proprietary product of Covestro, having a uretdione equivalent weight of 1,276 and a viscosity of 817 cPs in 50% butyl acetate.

The BASECOAT formulations A, B, C, D, E, F, G, and H in Table I were prepared following the same procedure. Five parts of respective ADDITIVE (C, D, E, F, G, H, I, and J) was mixed in with 100 parts of BASECOAT A and grinded using glass beads in a metal can by using a paint shaker. After grinding, 50 parts of REDUCER A and the resulting mixture was mixed in a 200 mL plastic container using a FLACKTEK speed mixer for one minute followed by application using a conventional HVLP spray. The BASECOAT formulation I is a reference formulation that did not need to be mixed with any of the ADDITIVES C, D, E, F, G, H, I, and J.

The clear-coat Formulations A, B, C, D, E, F, G, H, and I in Table I were prepared as follows. POLYOL A had been reacted with ADDITIVE A prior to formulation. In a 200 mL plastic container 9.52 parts of the POLYOL A and ADDITIVE A reaction mixture, 0.38 parts ADDITIVE C, 0.20 parts CATALYST A, 25.17 parts n-butyl acetate, and 64.74 parts URETDIONE A were added. The resulting mixture was mixed using a FLACKTEK speed mixer for one minute followed by application using a conventional HVLP spray.

Iron phosphate treated ACT B952, 4"×12" test panels were used. Thickness of basecoat was 2 mils (50 μm) wet and thickness of the one component coating was 5 mils (125 μm) wet (2 mils (50 μm) dry). The resulting panels were used to test for MEK double rubs.

MEK double rubs were measured according to ASTM D4752-10(2015). Results reported are an average of three readings for each formulation. One day (RT) is the test results of the coatings (basecoat, clear-coat) that were cured at room temperature for 1 day (no long term basecoat aging). One day (100° C.) is the test results of the coatings (basecoat, clear-coat) that were cured at 100° C. for 30 minutes and resting at room temperature for 1 day before testing (no long term basecoat aging). 6 weeks (RT) is the test results of the coatings that ADDITIVES C, D, E, F, G, H, I and J had been aged with BASECOAT A at room temperature for 6 weeks. Then the coatings (basecoat, clear-coat) were cured at room temperature for one day followed by MEK DR testing (basecoat had been aged for 6 weeks). 6 weeks (100° C.) is the test results of the coatings that ADDITIVES C, D, E, F, G, H, I and J had been aged with BASECOAT A at room temperature for 6 weeks. Then the coatings (basecoat, clear-coat) were cured at 100° C. for 30 minutes and resting at room temperature for 1 day before testing (basecoat had been aged for 6 weeks).

TABLE I

| | A | B | C | D | E | F | G | H | I |
|---|---|---|---|---|---|---|---|---|---|
| BASECOAT | | | | | | | | | |
| BASECOAT A (mL) | 100 | 100 | 100 | 100 | 100 | 100 | 100 | 100 | 100 |
| ADDITIVE C | 5 | | | | | | | | |
| ADDITIVE D | | 5 | | | | | | | |
| ADDITIVE E | | | 5 | | | | | | |
| ADDITIVE F | | | | 5 | | | | | |
| ADDITIVE G | | | | | 5 | | | | |
| ADDITIVE H | | | | | | 5 | | | |
| ADDITIVE I | | | | | | | 5 | | |
| ADDITIVE J | | | | | | | | 5 | |
| REDUCER A (mL) | 50 | 50 | 50 | 50 | 50 | 50 | 50 | 50 | 50 |
| CLEAR-COAT | | | | | | | | | |
| POLYOL A | 9.13 | 9.13 | 9.13 | 9.13 | 9.13 | 9.13 | 9.13 | 9.13 | 9.13 |
| ADDITIVE A | 0.39 | 0.39 | 0.39 | 0.39 | 0.39 | 0.39 | 0.39 | 0.39 | 0.39 |
| ADDITIVE C | 0.38 | 0.38 | 0.38 | 0.38 | 0.38 | 0.38 | 0.38 | 0.38 | 0.38 |
| CATALYST A | 0.20 | 0.20 | 0.20 | 0.20 | 0.20 | 0.20 | 0.20 | 0.20 | 0.20 |
| n-BA | 25.17 | 25.17 | 25.17 | 25.17 | 25.17 | 25.17 | 25.17 | 25.17 | 25.17 |
| URETDIONE A | 64.74 | 64.74 | 64.74 | 64.74 | 64.74 | 64.74 | 64.74 | 64.74 | 64.74 |
| MEK Double Rubs | | | | | | | | | |
| 1 Day (RT) | 5 | 5 | 6 | 15 | 11 | 9 | 17 | 26 | 5 |
| 1 Day (100° C.) | 43 | 17 | 12 | 34 | 47 | 21 | 56 | 78 | 5 |

TABLE I-continued

|                | A  | B  | C  | D  | E  | F  | G  | H   | I |
|----------------|----|----|----|----|----|----|----|-----|---|
| 6 Weeks (RT)   | 5  | 8  | 10 | 23 | 24 | 20 | 17 | 33  | 5 |
| 6 Weeks (100° C.) | 62 | 45 | 37 | 95 | 80 | 55 | 88 | 137 | 5 |

As can be appreciated by reference to Table I, Examples A, B, C, D, E, F, G, and H in Table I have some additive modification of the BASECOAT A. Example I is a reference formulation that did not receive any additives into BASECOAT A. All examples A, B, C, D, E, F, G, H, and I received the same clear-coat over basecoat. Looking at MEK double rubs results, it is apparent to those skilled in the art that neutralization of basecoat with the inorganic salt improves chemical resistance of clear-coat significantly.

This specification has been written with reference to various non-limiting and non-exhaustive embodiments. However, it will be recognized by persons having ordinary skill in the art that various substitutions, modifications, or combinations of any of the disclosed embodiments (or portions thereof) may be made within the scope of this specification. Thus, it is contemplated and understood that this specification supports additional embodiments not expressly set forth herein. Such embodiments may be obtained, for example, by combining, modifying, or reorganizing any of the disclosed steps, components, elements, features, aspects, characteristics, limitations, and the like, of the various non-limiting embodiments described in this specification. In this manner, Applicant reserves the right to amend the claims during prosecution to add features as variously described in this specification, and such amendments comply with the requirements of 35 U.S.C. § 112(a), and 35 U.S.C. § 132(a).

Various aspects of the subject matter described herein are set out in the following numbered clauses:

1. A system comprising: an allophanate composition comprising a neutralized polyol, a polyuretdione resin, a tertiary amine catalyst, an additive package, and a reducer, and a neutralized basecoat comprising an inorganic salt and a pigment.

2. The system according to clause 1, wherein the tertiary amine is an amidine.

3. The system according to clause 1, wherein the tertiary amine is selected from the group consisting of one selected from the group consisting of 1,8-diazabicyclo[5.4.0]undec-7-ene, 7-methyl-1,5,7-triazabicyclo[4.4.0]dec-5-ene, 1,4,5,6-tetrahydro-1,2-dimethylpyrimidine, 1,2,4-triazole, sodium derivative and 2-tert-butyl-1,1,3,3-tetramethylguanidine, and combinations thereof.

4. The system according to one of clauses 1 to 3, wherein the neutralized polyol comprises the reaction product of a polyol and an acid scavenger selected from the group consisting of carbodiimides and epoxies.

5. The system according to clause 4, wherein the polyol is selected from the group consisting of polyalkylene ether polyols, polyester polyols hydroxyl containing polycaprolactones, hydroxyl-containing (meth)acrylic polymers, polycarbonate polyols, polyurethane polyols, and combinations thereof.

6. The system according to one of clauses 1 to 5, wherein the neutralized basecoat comprises the complexation product of a basecoat with an inorganic salt.

7. The system according to clause 6, wherein the inorganic salt comprises a metal.

8. The system according to clause 7, wherein the metal is selected from the group consisting of titanium, vanadium, aluminum chromium, manganese, potassium, iron, cobalt, nickel, lithium, copper, zirconium, zinc, lanthanum, cerium, praseodymium, neodymium, promethium, samarium, europium, gadolinium, terbium, dysprosium, holmium, erbium, thulium, ytterbium, and lutetium.

9. The system according to clause 6, wherein the inorganic salt is selected from the group consisting of zinc(II) acetylacetonate, aluminum acetylacetonate, iron(III) acetylacetonate, lithium acetylacetonate, nickel(II) acetylacetonate, zirconium(IV) acetylacetonate, and potassium acetylacetonate.

10. The system according to one of clauses 1 to 9, wherein the pigment is selected from the group consisting of inorganic white pigments, inorganic chromatic pigments, iron oxide pigments, oxidic mixed-phase pigments, organic pigments, and inorganic black pigments.

11. The system according to one of clauses 1 to 10, wherein the pigment is selected from the group consisting of titanium dioxide, zinc oxide (ZnO), zirconium oxide, lead white, lead sulfate, zinc sulfide, and lithopones, titanium dioxide, bismuth vanadate, cadmium, cerium sulfide, chromate, ultramarine iron blue pigments, Color Index Pigment Yellow 42, Pigment Red 101, Pigment Blue 11, Pigment Brown 6, transparent iron oxide pigments, Color Index Pigment Green 17, Pigment Green 18, nickel titanium yellow, chromium titanium yellow, cobalt green, cobalt blue, zinc iron brown, chromium iron brown, iron manganese black, spinel black, carbon black, and black iron oxide.

12. The system according to one of clauses 1 to 11, wherein the system further includes an additive package selected from the group consisting of flow control additives, wetting agents, pigments (colorants), and solvents.

13. The system according to one of clauses 1 to 12, wherein the polyuretdione resin comprises the reaction product of catalytic dimerization of an isocyanate.

14. The system according to clause 13, wherein the isocyanate is selected from the group consisting of 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3- and 1,4-diisocyanate, 1-isocyanato-2-isocyanato-methyl cyclopentane, 1-isocyanato-3-isocyanatomethyl-3,5,5-trimethyl cyclohexane (isophorone diisocyanate or IPDI), bis-(4-isocyanatocyclohexyl)methane, 1,3- and 1,4-bis(isocyanatomethyl)-cyclohexane, bis-(4-isocyanato-3-methyl-cyclohexyl)-methane, α,α,α',α'-tetramethyl-1,3- and 1,4-xylene diisocyanate, 1-isocyanato-1-methyl-4(3)-isocyanato-methyl cyclohexane, and 2,4- and 2,6-hexahydrotoluene diisocyanate, toluene diisocyanate (TDI), diphenylmethane diisocyanate (MDI), pentane diisocyanate (PDI)—bio-based, and, isomers of any of these.

15. The system according to one of clauses 1 to 14, wherein the reducer is selected from the group consisting of n-butyl acetate, ethyl acetate, 2-methoxy-1-methylethyl acetate, 1-methoxy-2-propyl acetate, 2-methoxy-1-propyl acetate, 2-ethoxyethyl acetate, n-heptane, methylcyclohexane, toluene, acetone, VM&P naphtha, naphtha, light aliphatic solvent naphtha, acetate, isobutyl acetate, mixed xylenes, ethylbenzene, methyl ethyl ketone, dimethyl ketone, methyl n-amyl ketone, methyl isobutyl ketone, 1,2,4 trimethyl benzene, isopropylbenzene, ethyl benzene, 1-chloro-4 (triflouromethyl) benzene, propylene glycol methyl ether, and ethyl-3-ethoxy propionate and combinations thereof.

16. One of a coating, an adhesive, a casting, a composite, and a sealant comprising the system made according to one of clauses 1 to 15.

17. A method of applying the system according to one of clauses 1 to 16 to a substrate, wherein the method comprises at least one of spraying, dipping, flow coating, rolling, brushing, and pouring.

18. A method of making an allophanate system comprising: combining a neutralized polyol with a polyuretdione resin in the presence of a tertiary amine catalyst, an additive package, and a reducer to produce an allophanate composition, and contacting the allophanate composition with a neutralized basecoat comprising an inorganic salt and a pigment.

19. The method according to clause 18 wherein the tertiary amine catalyst comprises an amidine.

20. The method according to clause 18, wherein the tertiary amine is selected from the group consisting of one selected from the group consisting of 1,8-diazabicyclo[5.4.0]undec-7-ene, 7-methyl-1,5,7-triazabicyclo[4.4.0]dec-5-ene, 1,4,5,6-tetrahydro-1,2-dimethylpyrimidine, 1,2,4-triazole, sodium derivative and 2-tert-butyl-1,1,3,3-tetramethylguanidine, and combinations thereof.

21. The method according to one of clauses 18 to 20, wherein the neutralized polyol comprises the reaction product of a polyol and an acid scavenger selected from the group consisting of carbodiimides and epoxies.

22. The method according to clause 21, wherein the polyol is selected from the group consisting of polyalkylene ether polyols, polyester polyols, hydroxyl containing polycaprolactones, hydroxyl-containing (meth)acrylic polymers, polycarbonate polyols, polyurethane polyols, and combinations thereof.

23. The method according to one of clauses 18 to 22, wherein the neutralized basecoat comprises the complexation product of a basecoat with an inorganic salt.

24. The system according to clause 23, wherein the inorganic salt comprises a metal.

25. The system according to clause 24, wherein the metal is selected from the group consisting of titanium, vanadium, aluminum chromium, manganese, potassium, iron, cobalt, nickel, lithium, copper, zirconium, zinc, lanthanum, cerium, praseodymium, neodymium, promethium, samarium, europium, gadolinium, terbium, dysprosium, holmium, erbium, thulium, ytterbium, and lutetium.

26. The system according to clause 23, wherein the inorganic salt is selected from the group consisting of zinc(II) acetylacetonate, aluminum acetylacetonate, iron(III) acetylacetonate, lithium acetylacetonate, nickel(II) acetylacetonate, zirconium(IV) acetylacetonate, and potassium acetylacetonate.

27. The method according to one of clauses 18 to 26, wherein the pigment is selected from the group consisting of inorganic white pigments, inorganic chromatic pigments, iron oxide pigments, oxidic mixed-phase pigments, organic pigments, and inorganic black pigments.

28. The method according to one of clauses 18 to 27, wherein the pigment is selected from the group consisting of titanium dioxide, zinc oxide (ZnO), zirconium oxide, lead white, lead sulfate, zinc sulfide, and lithopones, titanium dioxide, bismuth vanadate, cadmium, cerium sulfide, chromate, ultramarine iron blue pigments, Color Index Pigment Yellow 42, Pigment Red 101, Pigment Blue 11, Pigment Brown 6, transparent iron oxide pigments, Color Index Pigment Green 17, Pigment Green 18, nickel titanium yellow, chromium titanium yellow, cobalt green, cobalt blue, zinc iron brown, chromium iron brown, iron manganese black, spinel black, carbon black, and black iron oxide.

29. The method according to one of clauses 18 to 28, further including an additive package selected from the group consisting of flow control additives, wetting agents, pigments (colorants), and solvents.

30. The method according to one of clauses 18 to 29, wherein the polyuretdione resin comprises the reaction product of catalytic dimerization of an isocyanate.

31. The method according to clause 30, wherein the isocyanate is selected from the group consisting of 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3- and 1,4-diisocyanate, 1-isocyanato-2-isocyanato-methyl cyclopentane, 1-isocyanato-3-isocyanatomethyl-3,5,5-trimethyl cyclohexane (isophorone diisocyanate or IPDI), bis-(4-isocyanatocyclohexyl)methane, 1,3- and 1,4-bis(isocyanatomethyl)-cyclohexane, bis-(4-isocyanato-3-methyl-cyclohexyl)-methane, α,α,α',α'-tetramethyl-1,3- and 1,4-xylene diisocyanate, 1-isocyanato-1-methyl-4(3)-isocyanato-methyl cyclohexane, and 2,4- and 2,6-hexahydrotoluene diisocyanate, toluene diisocyanate (TDI), diphenylmethane diisocyanate (MDI), pentane diisocyanate (PDI)—bio-based, and, isomers of any of these.

32. The method according to one of clauses 18 to 31, wherein the reducer is selected from the group consisting of n-butyl acetate, ethyl acetate, 2-methoxy-1-methylethyl acetate, 1-methoxy-2-propyl acetate, 2-methoxy-1-propyl acetate, 2-ethoxyethyl acetate, n-heptane, methylcyclohexane, toluene, acetone, VM&P naphtha, naphtha, light aliphatic solvent naphtha, acetate, isobutyl acetate, mixed xylenes, ethylbenzene, methyl ethyl ketone, dimethyl ketone, methyl n-amyl ketone, methyl isobutyl ketone, 1,2,4-trimethyl benzene, isopropylbenzene, ethyl benzene, 1-chloro-4 (triflouromethyl) benzene, propylene glycol methyl ether, and ethyl-3-ethoxy propionate and combinations thereof.

33. One of a coating, an adhesive, a casting, a composite, and a sealant comprising the allophanate system made according to one of clauses 18 to 32.

34. A method of applying the allophanate system made according to one of clauses 18 to 33 to a substrate, wherein the method comprises at least one of spraying, dipping, flow coating, rolling, brushing, and pouring.

What is claimed is:

1. A system comprising:
   an allophanate composition comprising,
   a neutralized polyol,
   a polyuretdione resin,
   a tertiary amine catalyst,
   an additive package; and
   a neutralized basecoat comprising,
   an inorganic salt, and
   a pigment.

2. The system according to claim 1, wherein the tertiary amine is an amidine.

3. The system according to claim 1, wherein the tertiary amine is selected from the group consisting of 1,8-diazabicyclo[5.4.0]undec-7-ene, 7-methyl-1,5,7-triazabicyclo[4.4.0]dec-5-ene, 1,4,5,6-tetrahydro-1,2-dimethylpyrimidine, sodium-1,2,4 triazolide, 2 tert-butyl-1,1,3,3-tetramethylguanidine, and combinations thereof.

4. The system according to claim 1, wherein the neutralized polyol comprises the reaction product of a polyol and an acid scavenger selected from the group consisting of carbodiimides and epoxies.

5. The system according to claim 4, wherein the polyol is selected from the group consisting of polyalkylene ether polyols, polyester polyols, hydroxyl containing polycaprolactones, hydroxyl-containing (meth)acrylic polymers, polycarbonate polyols, polyurethane polyols, and combinations thereof.

6. The system according to claim 1, wherein the neutralized basecoat comprises the reaction product of a basecoat with an inorganic salt.

7. The system according to claim 6, wherein the inorganic salt comprises a metal.

8. The system according to claim 7, wherein the metal is selected from the group consisting of titanium, vanadium, aluminum chromium, manganese, potassium, iron, cobalt, nickel, lithium, copper, zirconium, zinc, lanthanum, cerium, praseodymium, neodymium, promethium, samarium, europium, gadolinium, terbium, dysprosium, holmium, erbium, thulium, ytterbium, and lutetium.

9. The system according to claim 6, wherein the inorganic salt is selected from the group consisting of zinc(II) acetylacetonate, aluminum acetylacetonate, iron(III) acetylacetonate, lithium acetylacetonate, nickel(II) acetylacetonate, zirconium(IV) acetylacetonate, and potassium acetylacetonate.

10. The system according to claim 1, wherein the pigment is selected from the group consisting of inorganic white pigments, inorganic chromatic pigments, iron oxide pigments, oxidic mixed-phase pigments, organic pigments, and inorganic black pigments.

11. The system according to claim 1, wherein the pigment is selected from the group consisting of titanium dioxide, zinc oxide (ZnO), zirconium oxide, lead white, lead sulfate, zinc sulfide, and lithopones, titanium dioxide, bismuth vanadate, cadmium, cerium sulfide, chromate, ultramarine iron blue pigments, transparent iron oxide pigments, nickel titanium yellow, chromium titanium yellow, cobalt green, cobalt blue, zinc iron brown, chromium iron brown, iron manganese black, spinel black, carbon black, and black iron oxide.

12. The system according to claim 1, wherein the system further includes an additive package selected from the group consisting of flow control additives, wetting agents, pigments (colorants), and solvents.

13. The system according to claim 1, wherein the polyuretdione resin comprises the reaction product of catalytic dimerization of an isocyanate.

14. The system according to claim 13, wherein the isocyanate is selected from the group consisting of 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3- and 1,4-diisocyanate, 1-isocyanato-2-isocyanato-methyl cyclopentane, 1-isocyanato-3-isocyanatomethyl-3,5,5-trimethyl cyclohexane (isophorone diisocyanate or IPDI), bis-(4-isocyanatocyclohexyl)methane, 1,3- and 1,4-bis(isocyanatomethyl)-cyclohexane, bis-(4-isocyanato-3-methyl-cyclohexyl)-methane, α,α,α',α'-tetramethyl-1,3- and 1,4-xylene diisocyanate, 1-isocyanato-1-methyl-4(3)-isocyanato-methyl cyclohexane, and 2,4- and 2,6-hexahydrotoluene diisocyanate, toluene diisocyanate (TDI), diphenylmethane diisocyanate (MDI), pentane diisocyanate (PDI) bio-based, and, isomers of any of these.

15. The system according to claim 1, further comprising a reducer selected from the group consisting of n-butyl acetate, ethyl acetate, 2-methoxy-1-methylethyl acetate, 1-methoxy-2-propyl acetate, 2-methoxy-1-propyl acetate, 2-ethoxyethyl acetate, n-heptane, methylcyclohexane, toluene, acetone, VM&P naphtha, naphtha, light aliphatic solvent naphtha, acetate, isobutyl acetate, mixed xylenes, ethylbenzene, methyl ethyl ketone, dimethyl ketone, methyl n-amyl ketone, methyl isobutyl ketone, 1,2,4 trimethyl benzene, isopropylbenzene, ethyl benzene, 1-chloro-4 (triflouromethyl) benzene, propylene glycol methyl ether, and ethyl-3-ethoxy propionate and combinations thereof.

16. One of a coating, an adhesive, a casting, a composite, and a sealant comprising the system made according to claim 1.

17. A method of applying the system according to claim 1 to a substrate, wherein the method comprises at least one of spraying, dipping, flow coating, rolling, brushing, and pouring.

18. A method of making an allophanate system comprising:
combining a neutralized polyol with a polyuretdione resin in the presence of a tertiary amine catalyst, an additive package, and a reducer to produce an allophanate composition; and
contacting the allophanate composition with a neutralized basecoat comprising an inorganic salt and a pigment.

19. The method according to claim 18 wherein the tertiary amine catalyst comprises an amidine.

20. The method according to claim 18, wherein the tertiary amine is selected from the group consisting of 1,8-diazabicyclo[5.4.0]undec-7-ene, 7-methyl-1,5,7-triazabicyclo[4.4.0]dec-5-ene, 1,4,5,6-tetrahydro-1,2-dimethylpyrimidine, sodium-1,2,4 triazolide, 2 tert-butyl-1,1,3,3-tetramethylguanidine, and combinations thereof.

21. The method according to claim 18, wherein the neutralized polyol comprises the reaction product of a polyol and an acid scavenger selected from the group consisting of carbodiimides and epoxies.

22. The method according to claim 21, wherein the polyol is selected from the group consisting of polyalkylene ether polyols, polyester polyols, hydroxyl containing polycaprolactones, hydroxyl-containing (meth)acrylic polymers, polycarbonate polyols, polyurethane polyols, and combinations thereof.

23. The method according to claim 18, wherein the neutralized basecoat comprises the reaction product of a basecoat with an inorganic salt.

24. The method according to claim 23, wherein the inorganic salt comprises a metal.

25. The method according to claim 24, wherein the metal is selected from the group consisting of titanium, vanadium, aluminum chromium, manganese, potassium, iron, cobalt, nickel, lithium, copper, zirconium, zinc, lanthanum, cerium, praseodymium, neodymium, promethium, samarium, europium, gadolinium, terbium, dysprosium, holmium, erbium, thulium, ytterbium, and lutetium.

26. The method according to claim 23, wherein the inorganic salt is selected from the group consisting of zinc(II) acetylacetonate, aluminum acetylacetonate, iron(III) acetylacetonate, lithium acetylacetonate, nickel(II) acetylacetonate, zirconium(IV) acetylacetonate, and potassium acetylacetonate.

27. The method according to claim 18, wherein the pigment is selected from the group consisting of inorganic white pigments, inorganic chromatic pigments, iron oxide pigments, oxidic mixed-phase pigments, organic pigments, and inorganic black pigments.

28. The method according to claim 18, wherein the pigment is selected from the group consisting of titanium dioxide, zinc oxide (ZnO), zirconium oxide, lead white, lead sulfate, zinc sulfide, and lithopones, titanium dioxide, bismuth vanadate, cadmium, cerium sulfide, chromate, ultramarine iron blue pigments, transparent iron oxide pigments, nickel titanium yellow, chromium titanium yellow, cobalt green, cobalt blue, zinc iron brown, chromium iron brown, iron manganese black, spinel black, carbon black, and black iron oxide.

29. The method according to claim 18, further including an additive package selected from the group consisting of flow control additives, wetting agents, pigments (colorants), and solvents.

30. The method according to claim 18, wherein the polyuretdione resin comprises the reaction product of catalytic dimerization of an isocyanate.

31. The method according to claim 30, wherein the isocyanate is selected from the group consisting of 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3- and 1,4-diisocyanate, 1-isocyanato-2-isocyanato-methyl cyclopentane, 1-isocyanato-3-isocyanatomethyl-3,5,5-trimethyl cyclohexane (isophorone diisocyanate or IPDI), bis-(4-isocyanatocyclohexyl)methane, 1,3- and 1,4-bis(isocyanatomethyl)-cyclohexane, bis-(4-isocyanato-3-methyl-cyclohexyl)-methane, $\alpha,\alpha,\alpha',\alpha'$-tetramethyl-1,3- and 1,4-xylene diisocyanate, 1-isocyanato-1-methyl-4(3)-isocyanato-methyl cyclohexane, and 2,4- and 2,6-hexahydrotoluene diisocyanate, toluene diisocyanate (TDI), diphenylmethane diisocyanate (MDI), pentane diisocyanate (PDI) bio-based), and, isomers of any of these.

32. The method according to claim 18, wherein the reducer is selected from the group consisting of n-butyl acetate, ethyl acetate, 2-methoxy-1-methylethyl acetate, 1-methoxy-2-propyl acetate, 2-methoxy-1-propyl acetate, 2-ethoxyethyl acetate, n-heptane, methylcyclohexane, toluene, acetone, VM&P naphtha, naphtha, light aliphatic solvent naphtha, acetate, isobutyl acetate, mixed xylenes, ethylbenzene, methyl ethyl ketone, dimethyl ketone, methyl n-amyl ketone, methyl isobutyl ketone, 1,2,4 trimethyl benzene, isopropylbenzene, ethyl benzene, 1-chloro-4 (triflouromethyl) benzene, propylene glycol methyl ether, and ethyl-3-ethoxy propionate and combinations thereof.

33. One of a coating, an adhesive, a casting, a composite, and a sealant comprising the allophanate system made according to claim 18.

34. A method of applying the allophanate system made according to claim 18 to a substrate, wherein the method comprises at least one of spraying, dipping, flow coating, rolling, brushing, and pouring.

* * * * *